United States Patent
Louis et al.

(10) Patent No.: US 6,304,919 B1
(45) Date of Patent: *Oct. 16, 2001

(54) FIXED FRAME FOR A DRAWOUT ELECTRICAL SWITCH

(75) Inventors: Patrice Louis; Jocelyn Lemoine, both of Grenoble (FR)

(73) Assignee: Schneider Electric SA (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,118

(22) Filed: Nov. 2, 1998

(30) Foreign Application Priority Data

Dec. 9, 1997 (FR) .................................................. 9715810

(51) Int. Cl.[7] .............................. G06F 3/00; G06F 13/00; H02B 1/04
(52) U.S. Cl. ............................ 710/1; 710/101; 200/50.26
(58) Field of Search ................................. 710/1, 2, 101, 710/102, 103, 100; 361/600, 605, 622, 675, 679, 683, 730, 724, 736, 741, 781, 827, 608; 200/50.17, 50.26, 50.27, 50.28; 307/119

(56) References Cited

U.S. PATENT DOCUMENTS

| | | | |
|---|---|---|---|
| 4,236,189 | 11/1980 | Yosida | 361/337 |
| 5,010,438 | * 4/1991 | Brady | 361/56 |
| 5,448,675 | * 9/1995 | Leone et al. | 361/827 |
| 5,664,118 | * 9/1997 | Nishigaki et al. | 710/103 |
| 6,055,144 | * 4/2000 | Reid | 361/64 |

FOREIGN PATENT DOCUMENTS

| | | |
|---|---|---|
| 0 133 152 A1 | 2/1985 | (EP) . |
| 0 363 564 A1 | 4/1990 | (EP) . |
| 0 621 670 A1 | 10/1994 | (EP) . |

* cited by examiner

Primary Examiner—Xuan M. Thai
(74) Attorney, Agent, or Firm—Parkhurst & Wendel, L.L.P.

(57) ABSTRACT

The fixed frame comprises, on a side wall, a communication module. The communication module acts as interface between an external communication bus and indicating contacts whose state is representative of the connected or disconnected positions of a switchgear apparatus on the frame. The communication module is preferably fixed onto the external face of the wall, by the same fixing means as the indicating contacts. The wiring is thus reduced to the minimum when the apparatus is installed.

9 Claims, 4 Drawing Sheets

FIXED FRAME FOR A DRAWOUT ELECTRICAL SWITCH

BACKGROUND OF THE INVENTION

The invention relates to a fixed frame for a drawout electrical switch, comprising indicating contacts whose state is representative of the connected or disconnected position of the switch and which are fixed on an internal face of a wall of the frame.

Electrical switches, more particularly circuit breakers or contactors, are sometimes of the drawout type. They then comprise on the fixed frame indicating contacts indicating the connected or disconnected position, and also a possible intermediate test position of the apparatus.

In known apparatuses, wiring of these indicating contacts is performed wire to wire when installation of the apparatus takes place.

SUMMARY OF THE INVENTION

The object of the invention is to achieve a device enabling the wiring to be simplified.

According to the invention, this object is achieved by the fact that the frame comprises a communication module fixed onto said wall of the frame, near the indicating contacts, the communication module being electrically connected to the indicating contacts and comprising first means for electrical connection to a communication bus, the module constituting a communication interface between the indicating contacts and the bus.

According to a development of the invention the module comprises second means for electrical connection to a communication bus for connection to an internal communication bus designed to be connected to an additional communication module securedly affixed to the switch, the second means for connection being electrically connected to the first means for connection inside the connection module. The communication module then preferably comprises guide means for guiding the internal communication bus, for example in the form of at least one groove.

BRIEF DESCRIPTION OF THE DRAWINGS

Other advantages and features will become more clearly apparent from the following description of different embodiments given as non-restrictive examples only and represented in the accompanying drawings in which.

DETAILED DESCRIPTION

Figure 1:
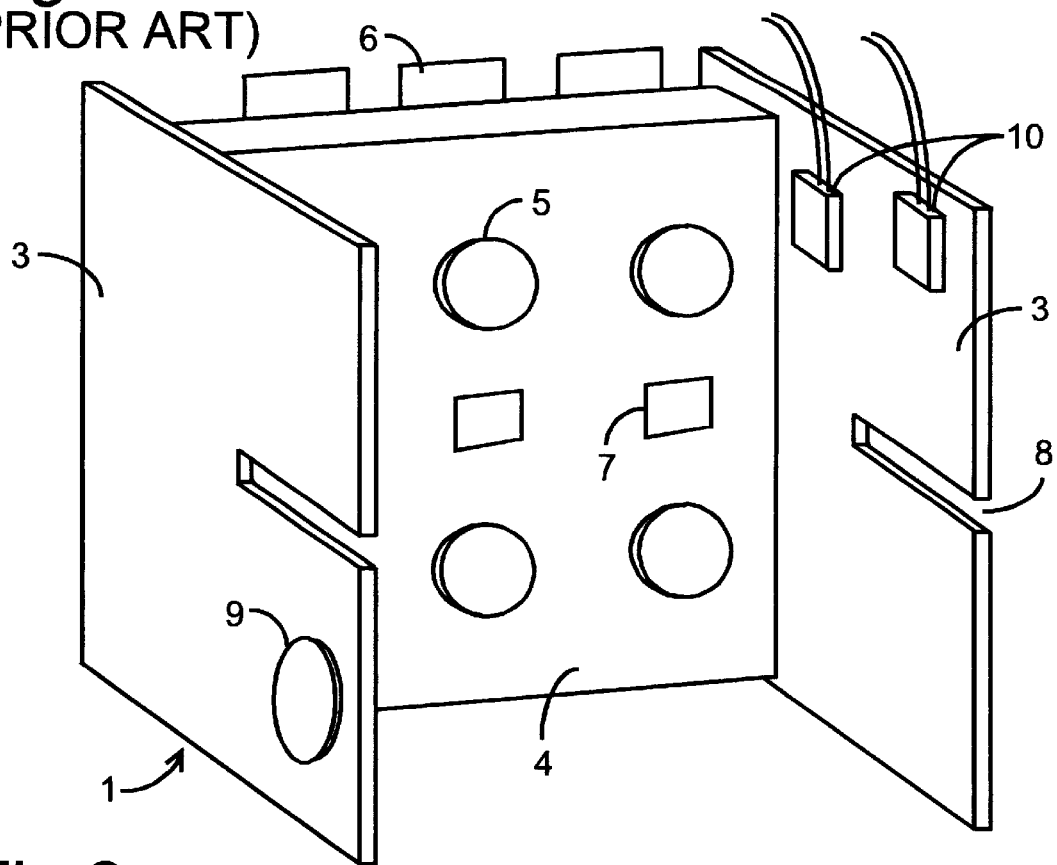
FIG. 1 represents the fixed frame of a drawout circuit breaker of the prior art.
Figure 2:
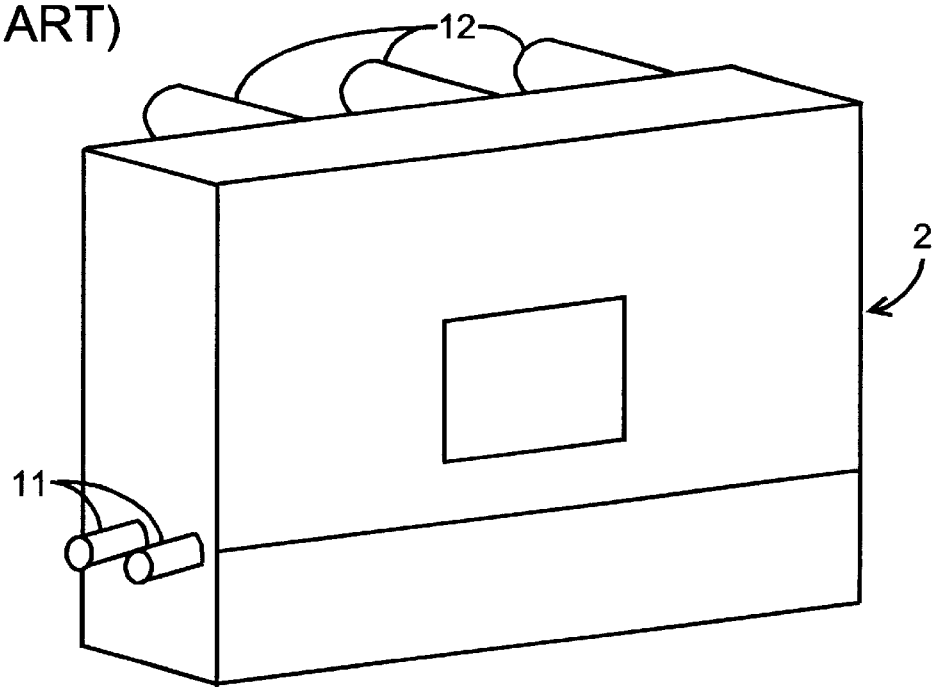
FIG. 2 represents a circuit breaker according to the prior art, designed to be mounted into the frame of FIG. 1.

In FIG. 1, the fixed frame 1, of known type (EP-A520, 625), on which a circuit breaker 2 is designed to be fitted, comprises two side walls 3. The latter are formed by two fixed flanges, fixed in parallel to two sides of a connecting base 4. The connecting base 4 is provided with connection terminals 5 electrically connected to connecting strips 6 for connection to an electrical power system to be protected.

The frame 1 also comprises the fixed parts 7 of drawout units designed for connection of auxiliary units fitted in the circuit breaker.

Each side wall 3 comprises a spindle guiding groove 8 and an external handle 9. Indicating contacts 10 indicating the connected/disconnected state of the circuit breaker are fixed onto the internal face of one of the walls 3.

Figure 3:
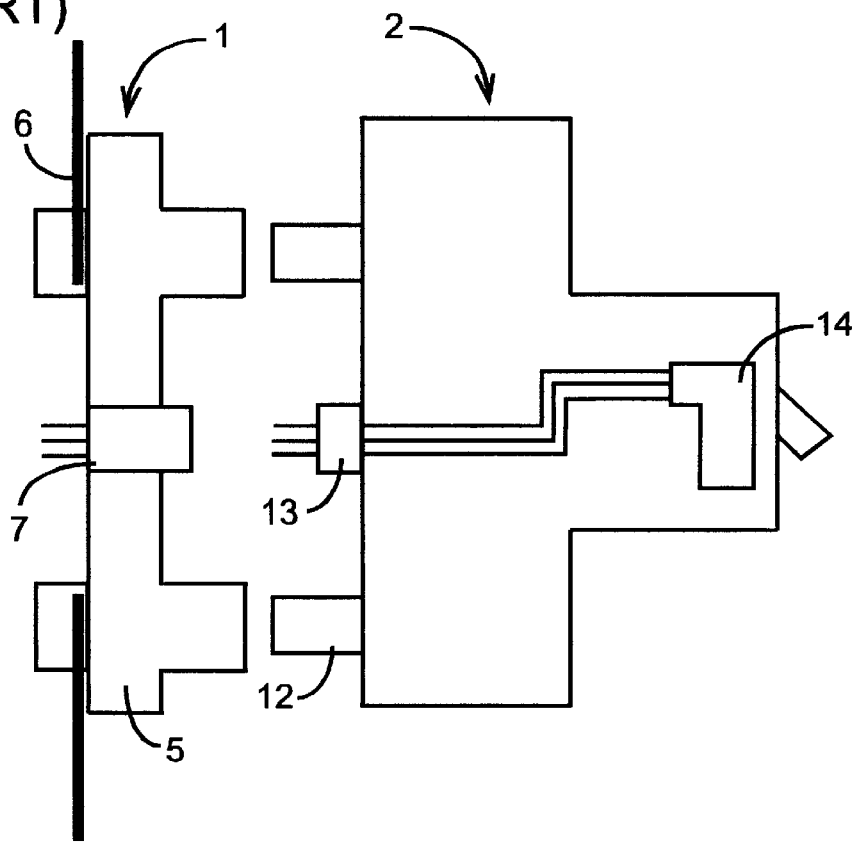
FIG. 3 schematically illustrates the electrical connections between a circuit breaker according to FIG. 2 and a frame according to FIG. 1.

The circuit breaker 2 comprises, on its side walls, drive spindles 11. It also comprises on its rear wall connecting grips 12 and the movable parts 13 of the drawout units (FIG. 3).

To mount the circuit breaker 2 into the fixed frame 1, the drive spindles 11 are inserted and guided in the spindle guiding grooves 8. The circuit breaker can thus be moved in translation according to an axis perpendicular to the connecting base 4 between a position in which it is disconnected and a position in which it is connected into the base 4. When connection takes place, the grips 12 connect in the terminals 5 and the fixed parts 7 and movable parts 13 of the drawout units connect with one another. In the connected position, the circuit breaker is thus automatically connected to the terminals 6. The auxiliary contacts 14 of the circuit breaker, connected to the parts 13 of the drawout units inside the circuit breaker, are also automatically connected to the fixed parts 7 of the drawout units which can be connected, wire to wire, to external indication supervision devices.

As represented schematically in FIG. 1, the indicating contacts 10 can be connected wire to wire to external indication or supervision devices. These contacts, formed for example by end-of-travel micro-contacts, supply signals corresponding to the position of the circuit breaker, connected, disconnected or in the intermediate test position.

Figure 4:
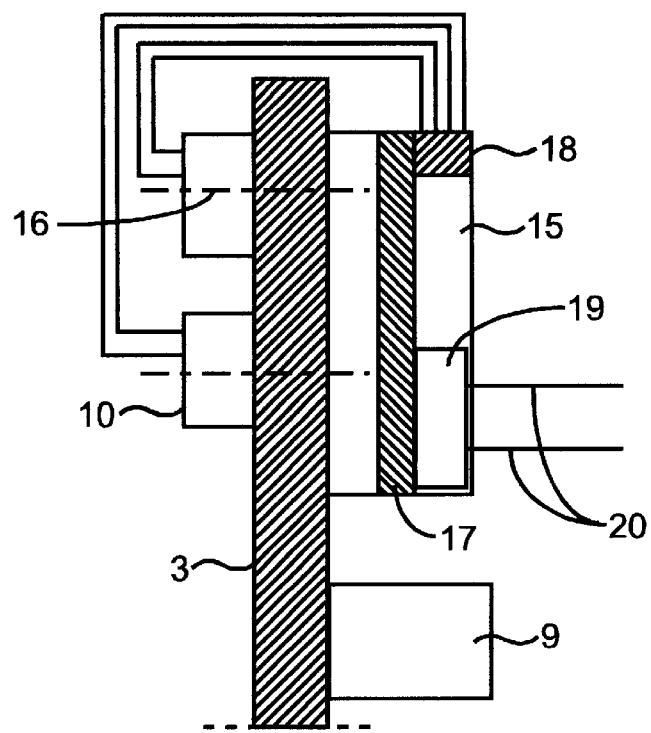
FIG. 4 represents, in cross section, a particular embodiment of a fixed frame according to the invention comprising a communication module.

In the particular embodiment of the invention illustrated in FIG. 4, one of the side walls of the fixed frame comprises a first communication module 15. The module 15 is fixed to the external face of the wall 3 which bears the indicating contacts 10 on its internal face. Common fixing parts, for example four screws, simultaneously serve the purpose of fixing the contacts 10 and the module 15. In FIG. 4, only the corresponding fixing spindles 16 are schematically represented. The module 15 comprises a processing board 17 on which a first connector 18 is mounted, for example formed by a screw terminal, to which the indicating contacts 10 are connected. The module 15 comprises at least a second connector 19, designed for connection to a first, or external communication bus 20, for example of BatiBUS or JBUS type. The module 15 constitutes a communication interface between the indicating contacts 10 and the external bus 20.

The thickness of the module 15 is preferably smaller than or equal to that of the handles 9 of the frame 1, so that fixing of the module 15 onto the frame does not modify the volume of the latter.

Figure 5:
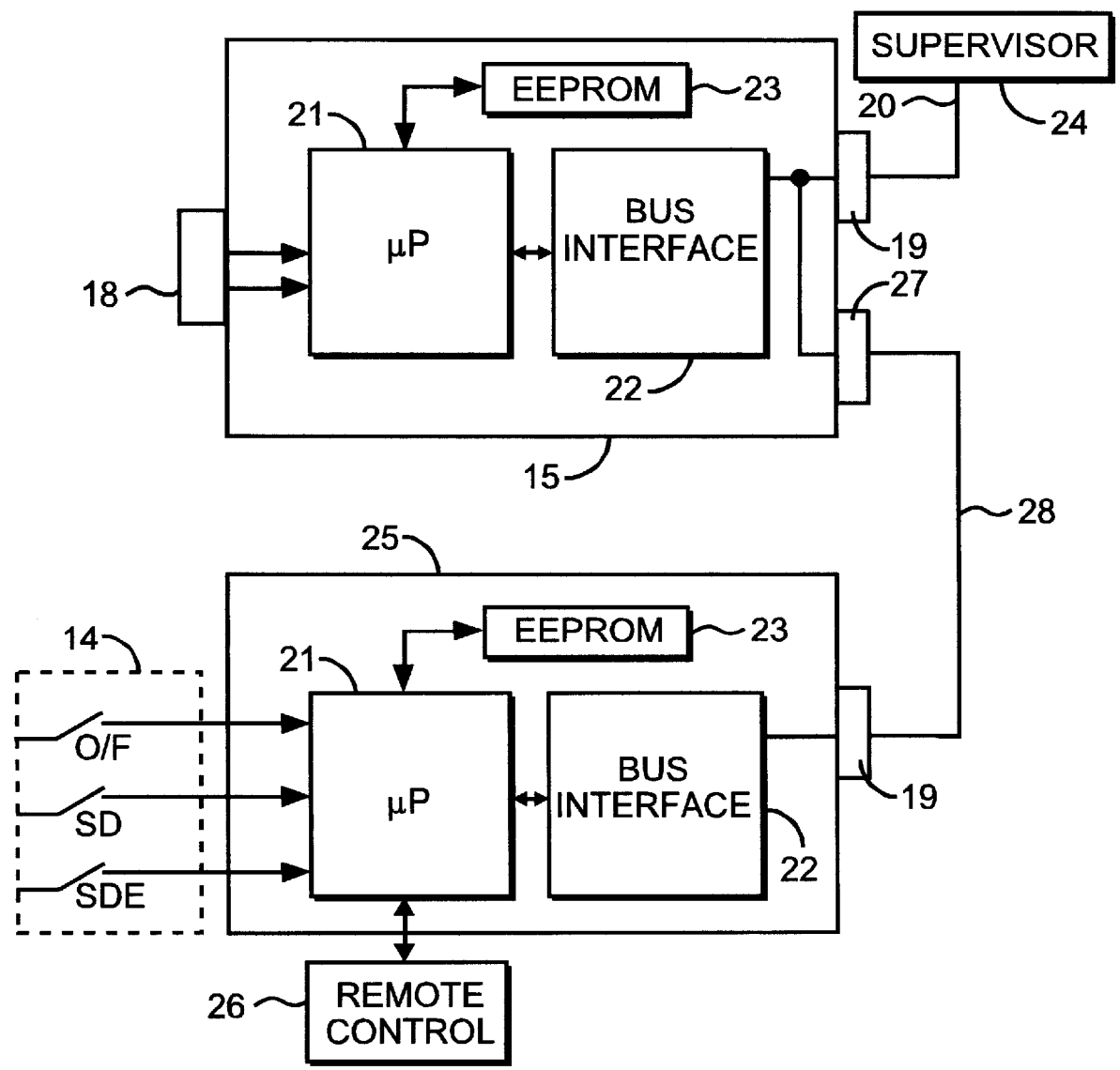
FIG. 5 illustrates, in block diagram form, a communication module of a frame according to FIG. 4, communicating with a supervisor and with an additional communication module securedly affixed to the circuit breaker.

FIG. 5 illustrates in greater detail the wiring diagram of the module 15. It comprises, on the processing board 17, a logic circuit preferably formed by a microprocessor 21 connected by an interface 22 to the second connector 19. The interface 22 may be achieved in software form and be integrated in the microprocessor 21. The micro-processor is also connected to the first connector 18. It can thus transmit the states of the indicating contacts 10 to the bus 20. The module 15 comprises a memory 23, preferably of EEPROM type, associated to the microprocessor 21. This memory is designed notably for storing the address of the module 15. In a preferred embodiment, a remote addressing process is automatically performed by a supervisor 24 by means of the bus 20 when the module 15 is powered up. If no address is stored in the EEPROM 23, or if the latter has to be modified, the supervisor attributes an address to the module 15.

In certain embodiments, the circuit breaker 2 comprises an internal communication module 25. As represented in FIG. 5, this module is of the same general type as the module 15, with a microprocessor 21, an interface 22, and a memory 23. It is connected on the one hand to auxiliary contacts 14 representative of the state of the circuit breaker and on the other hand to a remote control circuit 26. In FIG. 5, three auxiliary contacts are represented, respectively representing the open/closed position of the circuit breaker (O/F), the tripped state of the circuit breaker (SD) or the tripped on electrical fault state (SDE).

In the preferred embodiment of FIG. 5, the communication module 15 comprises a third connector 27 connected to its interface 22 and, by an internal, or second communication bus 28, to the module 25. Thus, when it is in the connected position, the circuit breaker communicates with the supervisor 24 via the bus 28, connectors 27 and 19, and the external bus 20. It can thus transmit the states of the auxiliary contacts 14 to the supervisor 24 and be remote controlled by the supervisor. The drawout units (7, 13) of known circuit breakers (FIG. 3) are then not necessary. The modules 15 and 25 preferably have the same address, which is supplied to them simultaneously by remote addressing from the supervisor 24.

Figure 6:
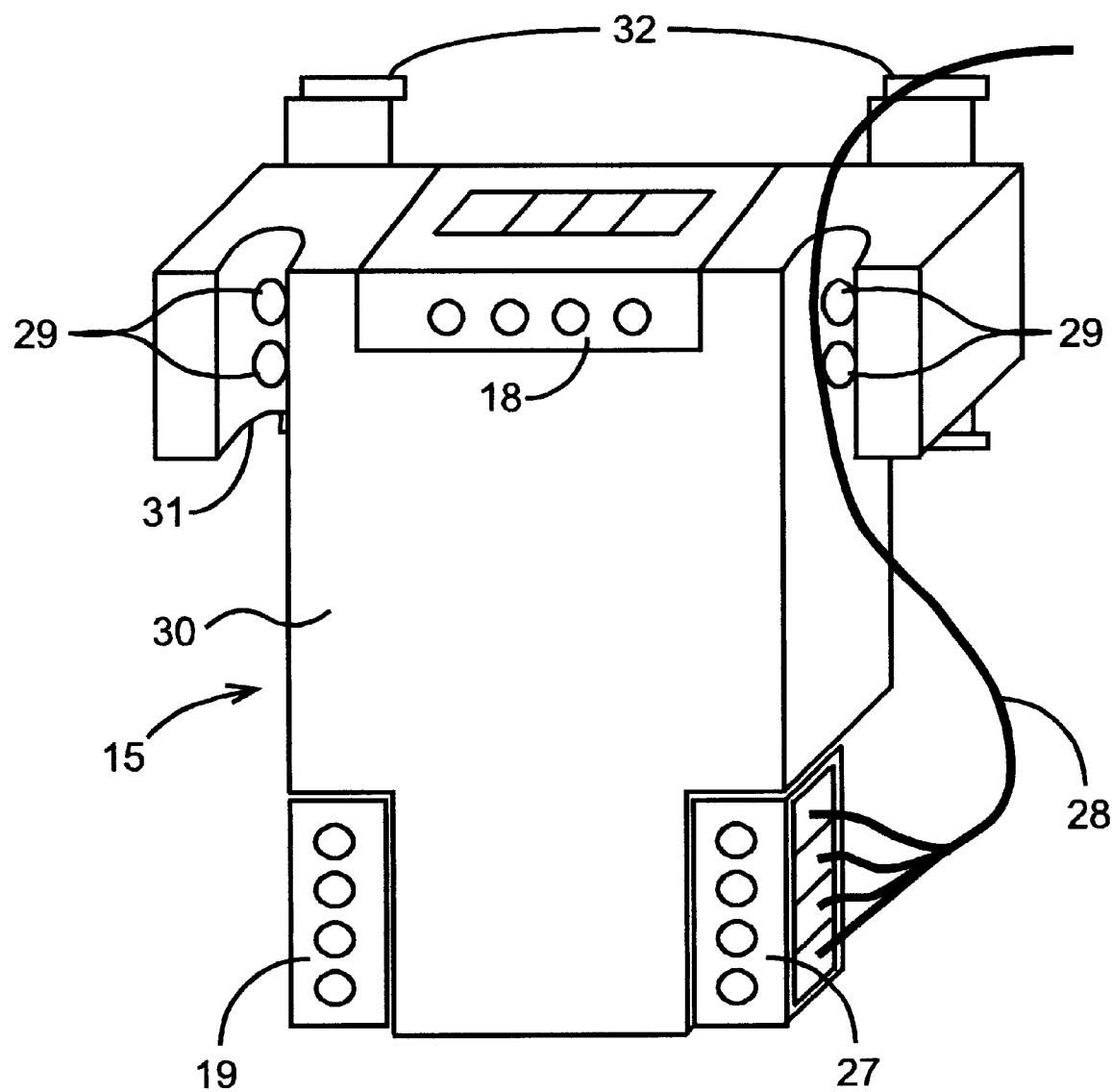
FIG. 6 represents, in perspective, a particular embodiment of a communication module according to FIGS. 4 and 5.

The particular embodiment of the communication module 15 represented in FIG. 6 is appreciably T-shaped. The horizontal bar of the T comprises on its side parts orifices 29 for passage of fixing screws for fixing the module to one of the walls 3 of the fixed frame 1. In the center of the horizontal bar there is located the connector 18, which is a standard type connector, so that the connection with the indicating contacts 10 reaches the upper face of the horizontal bar.

The vertical bar of the T is of smaller width in the lower part 30 to enable the connectors 19 and 27 to be fixed on each side of this lower part, preferably in the same volume. Guiding grooves 31 are formed vertically in the horizontal bar of the T, on each side of the vertical bar, for guiding the conductors of the bus 28 reaching the connector 27.

Wiring of the circuit breaker is thus greatly simplified. The switchboard fitter has a single connection to make by the bus 20, between the fixed frame 1 and a supervisor 24 and, if the circuit breaker 2 is equipped with an internal communication module 25, a single connection, by the bus 28, between the fixed frame and the circuit breaker.

The particular embodiment of the module 15 represented in FIG. 6 comprises in addition particular means 32 for fixing to an assembly interface, formed for example by fixing legs for a DIN rail. This enables, if required, a module of the type described above to be used in a switchboard.

The invention is not limited to the particular embodiments described above and extends in particular to any type of drawout electrical switchgear apparatus. The communication module can be fixed to the wall with fixing means other than the indicating contacts, and may be fixed to the internal face of the wall. The closer the indicating contacts are to the communication module, the less wiring is required.

What is claimed is:

1. A fixed frame in combination with a drawout electrical switch, comprising: a wall, having an internal face and an external face; indicating contacts located on the internal face of said wall for indicating a connected or disconnected position of the drawout electrical switch into the frame; a first communication bus; a first communication module fixed onto the external face of said wall near the indicating contacts, the communication module being electrically connected to the indicating contacts and comprising first means for electrical connection to the first communication bus, the communication module constituting a communication interface between the indicating contacts and the first communication bus.

2. The combination according to claim 1, comprising common fixing means for fixing the indicating contacts and the module to the wall.

3. The combination according to claim 1, further comprising a second communication bus; a second communication module affixed to the switch and connected to the second communication bus; second means for electrical connection to the first communication bus to the second communication bus; the second means for connection being electrically connected to the first means for connection inside the first communication module.

4. The combination according to claim 3, wherein the communication module comprises guide means for guiding the first communication bus.

5. The combination according to claim 4, wherein the guide means comprise a groove.

6. The combination according to claim 3, further comprising a supervisor, wherein the first communication module and the second communication module each comprises means for storing an address, said address, supplied by remote addressing by the communication bus from the supervisor, the address being identical for the first communication module and the second communication module connected thereto.

7. The combination according to any claim 1, wherein the communication module comprises additional fixing means designed to enable it to be fixed to an assembly interface.

8. The combination according to claim 1, further comprising an external handle, wherein the module has a thickness less than or equal to the handle, and wherein attaching the module to the frame does not modify the volume of the frame.

9. The combination according to claim 5 wherein the first module forms a T-shape comprising:
   a horizontal bar having holes located in both ends of the horizontal bar, the holes allowing passage of fastening means for attaching the module to a wall; guiding grooves, located vertically in both ends of the horizontal bar;
   a connector located approximately in the center of the horizontal bar, for connection to the indicating contacts and reaching the upper face of the horizontal bar; and
   a vertical bar attached approximately at the center of the horizontal bar, with first and second means of electrical connection attached to the vertical bar on respective sides of the lowest part of the vertical bar.

* * * * *